(12) United States Patent
Mailloux (10) Patent No.: US 11,260,767 B2
(45) Date of Patent: Mar. 1, 2022

(54) CABLE RETRIEVING SYSTEM FOR ELECTRIC VEHICLE CHARGING STATION

(71) Applicant: ADDÉNERGIE TECHNOLOGIES INC., Quebec (CA)

(72) Inventor: Daniel Mailloux, Quebec (CA)

(73) Assignee: ADDENERGIE TECHNOLOGIES INC., Quebec (CA)

( * ) Notice: Subject to any disclaimer, the term of this patent is extended or adjusted under 35 U.S.C. 154(b) by 153 days.

(21) Appl. No.: 16/703,493

(22) Filed: Dec. 4, 2019

(65) Prior Publication Data

US 2020/0180455 A1 Jun. 11, 2020

Related U.S. Application Data

(60) Provisional application No. 62/775,585, filed on Dec. 5, 2018.

(51) Int. Cl.
*B60L 53/30* (2019.01)
*B60L 53/16* (2019.01)
*B60L 53/18* (2019.01)

(52) U.S. Cl.
CPC .............. *B60L 53/30* (2019.02); *B60L 53/16* (2019.02); *B60L 53/18* (2019.02)

(58) Field of Classification Search
CPC ........... B60L 53/30; B60L 53/16; B60L 53/18
USPC ........................................................ 320/109
See application file for complete search history.

(56) References Cited

U.S. PATENT DOCUMENTS

| | | | | |
|---|---|---|---|---|
| 5,306,999 | A * | 4/1994 | Hoffman | B60L 53/31 320/109 |
| 6,216,834 | B1 * | 4/2001 | Steinhovden | B65H 75/368 191/12 R |
| 6,338,450 | B1 * | 1/2002 | Schwendinger | B60L 53/16 242/388.9 |
| 6,877,687 | B2 * | 4/2005 | Moon | B65H 75/40 137/355.2 |
| 9,346,656 | B2 * | 5/2016 | May | B66C 13/08 |
| 10,828,770 | B2 * | 11/2020 | Zhao | B60L 53/35 |
| 2007/0170799 | A1 * | 7/2007 | Snyder | H02N 11/008 310/103 |
| 2010/0252571 | A1 * | 10/2010 | Gehman | B67D 7/38 222/74 |
| 2010/0277127 | A1 * | 11/2010 | Flack | H02G 11/02 320/137 |
| 2011/0074351 | A1 * | 3/2011 | Bianco | G07F 15/005 320/109 |
| 2012/0013300 | A1 * | 1/2012 | Prosser | B60L 11/1844 320/109 |

(Continued)

*Primary Examiner* — Suresh Memula
(74) *Attorney, Agent, or Firm* — Wiggin & Dana LLP; Gregory S. Rosenblatt; Rikesh P. Patel (57) ABSTRACT

A cable retrieving system is disclosed for a charging station adapted for recharging an electric vehicle, the charging station comprising an electric cable and a plug for enabling an electrical connection with the electric vehicle, the system comprising a mechanical wire having a first end secured to the electric cable and a second end; an enclosure comprising an opening suitable for the mechanical wire and a pulling mechanism located in the enclosure, the pulling mechanism comprising a weight member located in the enclosure and mounted on a portion of the mechanical wire to thereby create a pulling force on the mechanical wire to thereby pull the electric cable towards the charging station.

17 Claims, 7 Drawing Sheets

(56) References Cited

U.S. PATENT DOCUMENTS

| | | | | |
|---|---|---|---|---|
| 2012/0048983 | A1* | 3/2012 | Bianco | B60L 11/1818 |
| | | | | 242/388.9 |
| 2013/0069325 | A1* | 3/2013 | Wallace | B62B 3/001 |
| | | | | 280/47.34 |
| 2013/0257373 | A1* | 10/2013 | Mallon, IV | B60L 53/31 |
| | | | | 320/109 |
| 2013/0307477 | A1* | 11/2013 | Reinschke | B60L 11/1824 |
| | | | | 320/109 |
| 2013/0320921 | A1* | 12/2013 | Muller | H02J 7/0042 |
| | | | | 320/109 |
| 2014/0001300 | A1 | 1/2014 | Ichihara et al. | |
| 2014/0021915 | A1* | 1/2014 | Staley | B60L 53/18 |
| | | | | 320/109 |
| 2014/0224914 | A1* | 8/2014 | Sugiura | B65H 75/44 |
| | | | | 242/379 |
| 2014/0263141 | A1* | 9/2014 | May | B66C 23/36 |
| | | | | 212/242 |
| 2015/0002091 | A1* | 1/2015 | Nakayama | H01F 38/14 |
| | | | | 320/108 |
| 2015/0060611 | A1* | 3/2015 | Takahashi | B60L 53/14 |
| | | | | 248/70 |
| 2016/0089995 | A1* | 3/2016 | Sugiura | B60L 53/18 |
| | | | | 320/109 |
| 2016/0089996 | A1* | 3/2016 | Sugiura | B60L 53/16 |
| | | | | 320/109 |
| 2017/0129355 | A1* | 5/2017 | Fournier | H02G 11/003 |
| 2017/0203662 | A1* | 7/2017 | Hiebenthal | B65H 75/368 |
| 2018/0083432 | A1* | 3/2018 | Gaillard | B60L 53/14 |
| 2019/0214807 | A1* | 7/2019 | Owens | B65H 75/368 |
| 2020/0369167 | A1* | 11/2020 | Krucinski | B60L 53/16 |

* cited by examiner

CABLE RETRIEVING SYSTEM FOR ELECTRIC VEHICLE CHARGING STATION

TECHNICAL FIELD

One or more embodiments of the invention relates to electric charging stations. More precisely, one or more embodiments of the invention pertains to a cable retrieving system for a charging station adapted for recharging an electric vehicle.

BACKGROUND

Providing charging stations for electric vehicles (EV) is very desirable.

A charging station equipped with an electric cable and a plug can be damaged or destroyed in the case where the cable and the plug are disposed on the ground after a charging session has ended.

In harsh winter conditions, when snow has covered the area near the charging station, the electric cable and the plug disposed on the ground may not be visible by snow scrapers' drivers which may lead to damage or destruction of the charging station by the snow scrapers.

Moreover, when disposed on the ground, the electric cable as well as the plug may be further damaged by drivers of electric vehicle driving over them.

There is therefore a need for a system which will retain the electric cable and the plug back to the charging station enclosure.

It will be appreciated that existing systems for retaining the electric cable and the plug back to the charging station suffer from various limitations. For instance, in the case where a retrieving system is provided on a charging station not directly facing the outlet of the electric vehicle, the retrieving force may cause some damages to the plug of the electric vehicle. In fact and more precisely, the user will lay out the electric cable around the electric vehicle in such a manner as to circumvent the electric vehicle. In these very frequent circumventing occurrences, the implementation of a retrieving force on the electric cable and the plug will create a physical contact between the electric cable and the electric vehicle body, thus increasing the possibility of damaging the surface of the electric vehicle body.

There is therefore a need for a cable retrieving system that will overcome at least one of the above identified drawbacks.

Features of one or more embodiments of the invention will be apparent from review of the disclosure, drawings and description of the invention below.

SUMMARY

According to a broad aspect, there is disclosed a cable retrieving system for a charging station adapted for recharging an electric vehicle, the charging station comprising an electric cable and a plug for enabling an electrical connection with the electric vehicle, the system comprising a mechanical wire having a first end secured to the electric cable and a second end; an enclosure comprising an opening suitable for the mechanical wire and a pulling mechanism located in the enclosure, the pulling mechanism comprising a weight member located in the enclosure and mounted on a portion of the mechanical wire to thereby create a pulling force on the mechanical wire to thereby pull the electric cable towards the charging station.

According to an embodiment, the cable retrieving system further comprises a blocking mechanism operatively coupled to the weight member and operating between a motion-restricted state in which the weight member is restricted from moving and the pulling force is reduced and a motion-unrestricted state in which the weight member is free to move vertically without restriction.

According to an embodiment, the enclosure is adjacent to the charging station.

According to an embodiment, at least one portion of the charging station defines the enclosure.

According to an embodiment, the second end of the mechanical wire is secured inside the enclosure; the weight member comprises a moveable counterweight and at least one pulley secured on the moveable counterweight and the mechanical wire is engaged on the at least one pulley of the weight member.

According to an embodiment, the second end of the mechanical wire is secured to the weight member.

According to an embodiment, the enclosure further comprises at least one pulley mounted inside the enclosure near the opening, further wherein the mechanical wire is engaged on the at least one pulley mounted inside the enclosure near the opening.

According to an embodiment, the blocking mechanism comprises an electromagnet electrically connected to a power source; a control unit operatively coupled to the electromagnet and at least one of the weight member and the enclosure comprises the electromagnet; and when said enclosure comprises the electromagnet, the weight member comprises a magnetically permeable portion; and when the weight member comprises the electromagnet, the enclosure comprises an elongated magnetically permeable portion located near the weight member; and when actuated using the control unit, the electromagnet causes the weight member to be biased against a corresponding magnetically permeable portion causing the weight member to be restricted from moving and the blocking mechanism to operate in the motion-restricted state; and when the electromagnet is not actuated, the pulling force generated by the weight member is sufficient to bring said plug towards the cable retrieving system.

According to an embodiment, the electromagnet comprises a coil, an iron core receiving the coil and at least two electrical conductors operatively connected to the iron core.

According to an embodiment, the elongated magnetically permeable portion is a portion of a wall of the enclosure.

According to an embodiment, the enclosure comprises the electromagnet; further wherein the electromagnet is installed along an elongated magnetically permeable portion comprising at least two electrical conductors secured in the enclosure.

According to an embodiment, the blocking mechanism comprises two rollers, a vertical belt looped around the two rollers and on which is secured the weight member, a friction generation element operatively connected to at least one of the at least two rollers, a control unit operatively connected to the friction generation element and when actuated using the control unit, the friction generation element causes the belt to be secured at a given position thereby reducing the pulling force.

According to an embodiment, the friction generation element comprises a clutch.

According to an embodiment, the friction generation element is composed of a disc and braking pads.

According to an embodiment, the friction generation element is composed of a brake drum and braking shoes.

According to an embodiment, the belt is made of an elastomeric material.

According to an embodiment, the belt is made of metal.

According to an embodiment, the belt comprises a chain.

According to an embodiment, the belt is toothed.

According to a broad aspect, there is disclosed a charging station comprising the cable retrieving system disclosed above.

BRIEF DESCRIPTION OF THE DRAWINGS

In order that the one or more embodiments of the invention may be readily understood, one or more embodiments of the invention are illustrated by way of example in the accompanying drawings. In the drawings:

FIGS. 3a and 3b are drawings which illustrate another embodiment of the weight member with, in this embodiment, an electromagnet secured to the enclosure of the cable retrieving system. FIG. 3a is a side-view, whereas

FIGS. 5a and 5b are drawings which illustrate another embodiment of the enclosure of the cable retrieving system. In this embodiment, the weight member comprises one pulley secured to the moveable counterweight and the enclosure further comprises two pulleys mounted inside the enclosure near the opening of the enclosure. FIG. 5b illustrates an enlarged view of the weight member shown in FIG. 5a.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain. For example, in the sentence "the computer sends data (i.e., instructions) over the Internet," the term "i.e." explains that "instructions" are the "data" that the computer sends over the Internet.

Neither the Title nor the Abstract is to be taken as limiting in any way as the scope of the disclosed invention(s). The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention is directed to a cable retrieving system for a charging station intended for charging an electric vehicle, wherein a mechanical wire has a first end secured to the electric cable near the plug and a second end wherein the mechanical wire exerts a controllable pulling force onto the electric cable and the plug.

More precisely, the cable retrieving system for a charging station adapted for recharging an electric vehicle disclosed herein comprises a mechanical wire having a first end secured to the electric cable and a second end. The cable retrieving system further comprises an enclosure comprising an opening suitable for the mechanical wire. The cable retrieving system further comprises a pulling mechanism located in the enclosure, the pulling mechanism comprising a weight member located in the enclosure and mounted on a portion of the mechanical wire to thereby create a pulling force on the mechanical wire to thereby pull the electric cable towards the charging station and a blocking mechanism operatively coupled to the weight member and operating between a motion-restricted state in which the weight member is restricted from moving and the pulling force is reduced and a motion-unrestricted state in which the weight member is capable of moving without restriction.

It will be appreciated, as further explained below, that the pulling mechanism of the cable retrieving system comprises a blocking mechanism used for setting a pulling force to a value ranging between 0 N and a desired force value. It will further be appreciated that the blocking mechanism enables the pulling force to be reduced after the electrical plug of the electric cable is inserted into the electric vehicle charging port and increased to a force value sufficiently high to elevate the charging station electric cable and the plug from the ground in the vertical direction after the electrical plug has been disconnected from the electric vehicle charging port.

Figure 1A:
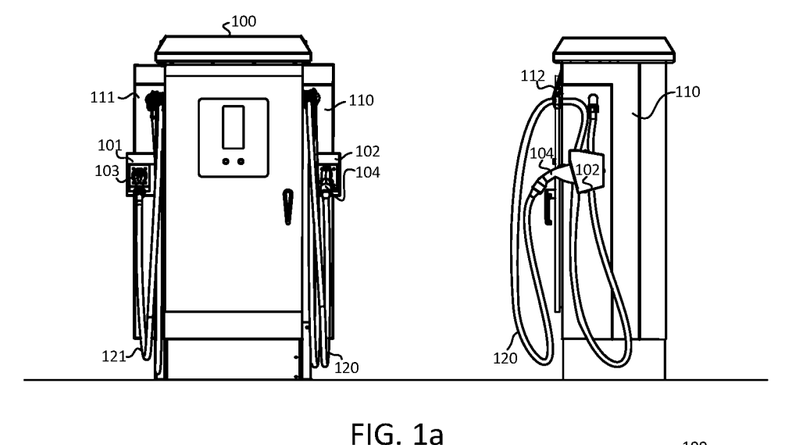
FIGS. 1a, 1b and 1c are drawings of an embodiment of a charging station with a cable retrieving system, wherein in FIG. 1a a mechanical wire is fully retrieved, and wherein the mechanical wire is fully extended with a tension in FIG. 1b, and further wherein the mechanical wire is fully extended with no tension in FIG. 1c. The cable retrieving system comprises, inter alia, an enclosure having an opening suitable for the mechanical wire and a pulling mechanism.
Figure 1B:
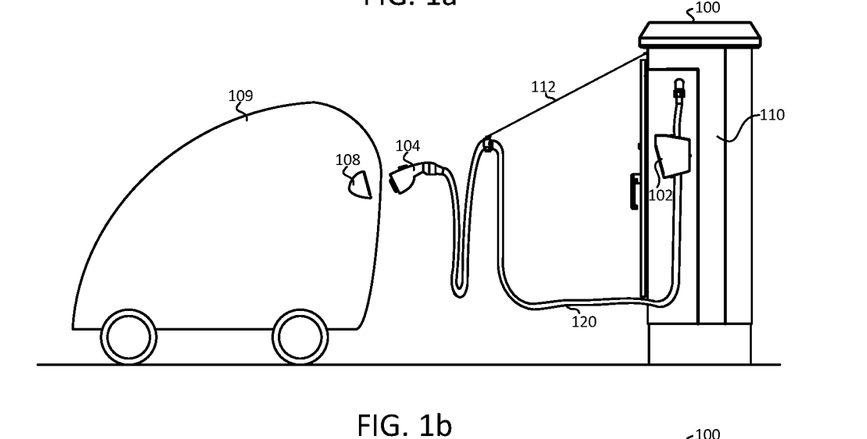
Figure 1C:
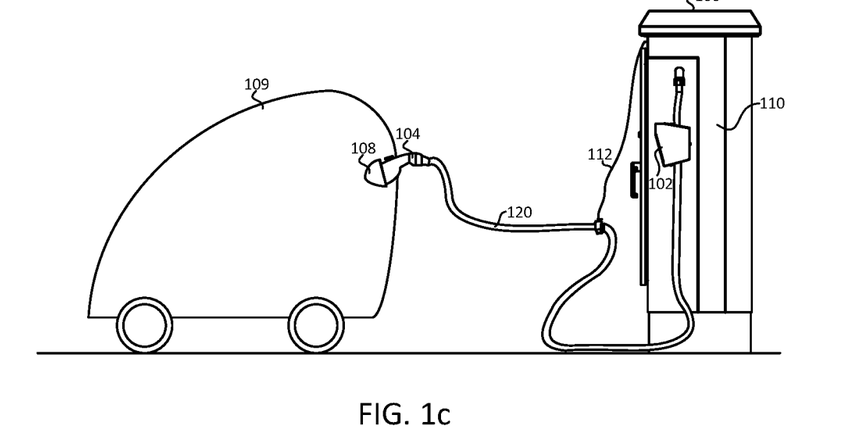

Now referring to FIG. 1a, FIG. 1b and FIG. 1c, it will be appreciated that a charging station 100 is provided with a cable retrieving system and further comprises an electric cable 120 and a plug 104. In FIG. 1a the plug 104 of the electric cable 120 is inserted into a corresponding charging station cradle 102 and the electric cable 120 is folded near the charging station 100 when no electric vehicle is operatively connected to the charging station 100. In FIGS. 1b and 1c, the electric cable 120 of the charging station 110 is extended to its full length when the plug 104 of the electric cable 120 is placed near the outlet 108 of the electric vehicle 109 by a user.

It will be appreciated that the charging station 100 illustrated in FIG. 1a and FIG. 1b comprises an enclosure 110 located, in one embodiment, at a right-hand side of the charging station 100. In one embodiment, the enclosure 110 of the charging station 100 comprises the pulling mechanism of the cable retrieving system. FIG. 1b shows a mechanical wire 112 secured to the electric cable 120, in close proximity to the plug 104 at a first end thereof. A second end of the mechanical wire 112, not shown, is secured within the enclosure 110.

The pulling mechanism comprised inside the enclosure 110 and not shown in FIGS. 1b and 1c provides a means for exerting a pulling force of a value which varies with time on the mechanical wire 112 which is of great advantage. A first consequence of the operation of one or more embodiments of the pulling mechanism disclosed herein is an assisted retrieving of the electrical cable 120 near the charging station 100 shortly after the plug 104 of the electric cable 120 is removed by the user from the electric vehicle outlet 108. FIG. 1a shows a state wherein the mechanical wire 112 is mostly retrieved.

A second consequence of the operation of one or more embodiments of the pulling mechanism disclosed herein is the application of a pulling force on the mechanical wire 112, when the user pulls the plug 104 of the electric cable 120 away from the charging station cradle 102, as shown for instance in FIG. 1b.

The skilled addressee will appreciate that, in one embodiment, a third consequence of the operation of one or more embodiments of the pulling mechanism disclosed herein is that the pulling force along the mechanical wire 112 is sharply reduced after the plug 104 of the electric cable 120 has been inserted into the electric vehicle outlet 108, as shown in FIG. 1c. It will be appreciated that in this case the electric cable 120 and the mechanical wire 112 are freed from any tension, thus enabling the user of the electric vehicle 109 to dispose of the electrical cable 120 in such a manner as to avoid an unintentional damage of the electric vehicle body by any one of the electric cable 120 and the mechanical wire 112 and to as well lower a mechanical stress applied on the electric vehicle outlet 108, which is of great advantage. In fact, it will be appreciated by the skilled addressee that applying a constant pulling force, in all operation modes of the charging station 110, will likely increase the risk of damaging the body of the electric vehicle 109 when the electric vehicle 109 is positioned such as it does not face directly the charging station 110. In fact, it will be appreciated that the cable retrieving system disclosed herein addresses this issue by advantageously controlling the mechanical tension applied on the mechanical wire 112 and thus enabling the tension to be timely reduced or canceled depending on a status of a connection between the plug 104 of the of the electric cable 120 and the electric vehicle outlet 108.

It will also be appreciated by the skilled addressee that the charging station 110 displayed in FIG. 1a comprises, in one embodiment, two electric cables 120, 121. The electric cable 120 is located at the right-hand side of the charging station 100, whereas the electric cable 121 is located at the left-hand side of the charging station 100. It will be appreciated by the skilled addressee that the charging station 100 shown in FIG. 1a therefore enables, in one embodiment, a simultaneous charging of two electric vehicles, which in the case of FIG. 1a also implies that two mechanical wires and two pulling mechanisms are disposed inside the enclosures 110 and 111. In another embodiment, the charging station 100 is provided with a single enclosure 110, a single electric cable 120 and a single mechanical wire 112. In another embodiment, the charging station is provided with more than two cable retrieving systems.

Still referring to FIGS. 1a, 1b and 1c, it will be appreciated that in this embodiment the cable retrieving system comprises an enclosure 110 which is a compartment mechanically appended to a main body of the charging station 100. The skilled addressee will appreciate that in another embodiment, the enclosure 110 of the cable retrieving system including the pulling mechanism is located inside a main cabinet of the charging station 100, whereas in another embodiment, the enclosure 110 of the cable retrieving system is mechanically separated from the main cabinet of the charging station 110. In other terms, it will be appreciated that while in one embodiment the enclosure 110 is adjacent to the charging station 100, in another embodiment, the enclosure 110 is defined by at least one portion of the charging station 100.

Figure 2A:
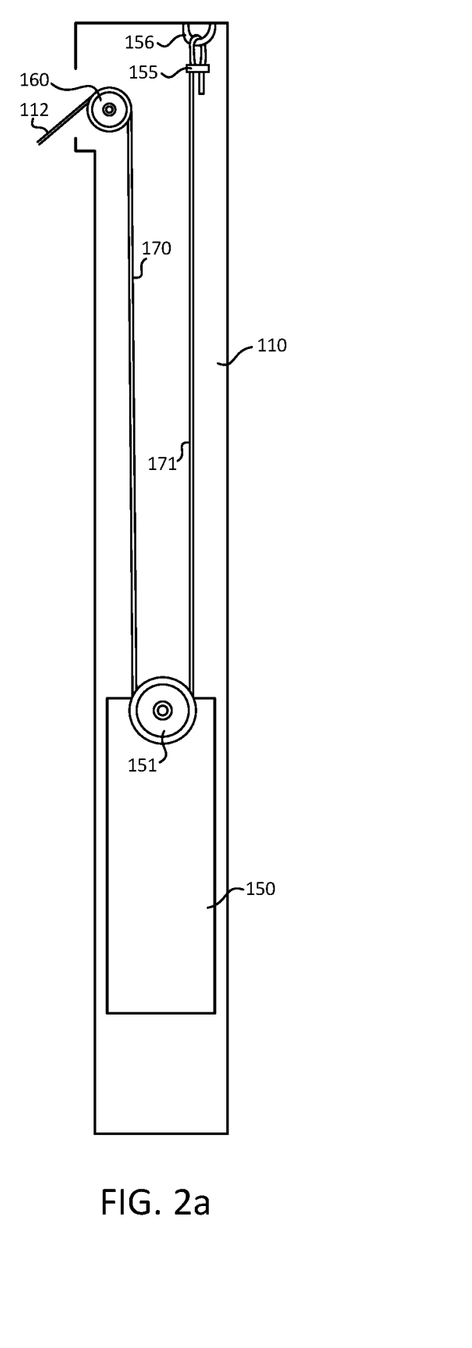
FIGS. 2a and 2b are drawings which illustrate an embodiment of the cable retrieving system enclosure and its pulling mechanism wherein the pulling mechanism comprises one pulley mounted inside the enclosure near an opening and a weight member comprising a moveable counterweight and a pulley secured to the moveable counterweight, and further wherein in the active retrieving system shown in FIG. 2b comprises a weight member having an electromagnet secured to the bottom of the moveable counterweight.

Now referring to FIG. 2a, there is illustrated a view showing the inside of one embodiment of the enclosure 110 of the cable retrieving system including its pulling mechanism. In this embodiment, the pulling mechanism comprises one pulley 160 secured to the enclosure 110, a weight member comprising a moveable counterweight 150 and one pulley 151 secured on the moveable counterweight 150. The pulley 160 is secured inside the enclosure 110 near an opening.

It will be appreciated that the pulley 151 has its hub mechanically secured to the moveable counterweight 150, the latter being free of moving up and down vertically, as to exert a tension onto a first portion 170 and a second portion 171 of the mechanical wire 112. The rotor part of the pulley 151 is free to rotate clockwise or counterclockwise. It will be appreciated that the mechanical wire 112 has its second end secured to a top portion of the enclosure 110 using, in one embodiment, a ring 156 fixed inside the enclosure 110. The skilled addressee will appreciate that the second end of the mechanical wire 112 may be secured to the enclosure 110 using various alternative embodiments. It will be appreciated by the skilled addressee that the other end of the mechanical wire 112 is secured to the electric cable 120, as disclosed in FIGS. 1a, 1b and 1c, and that this embodiment of the cable retrieving system will be characterized by a pulling range available on the electric cable 120 and the plug of approximately twice the maximum distance between the moveable pulley 151 and the fixed pulley 150.

Figure 2B:
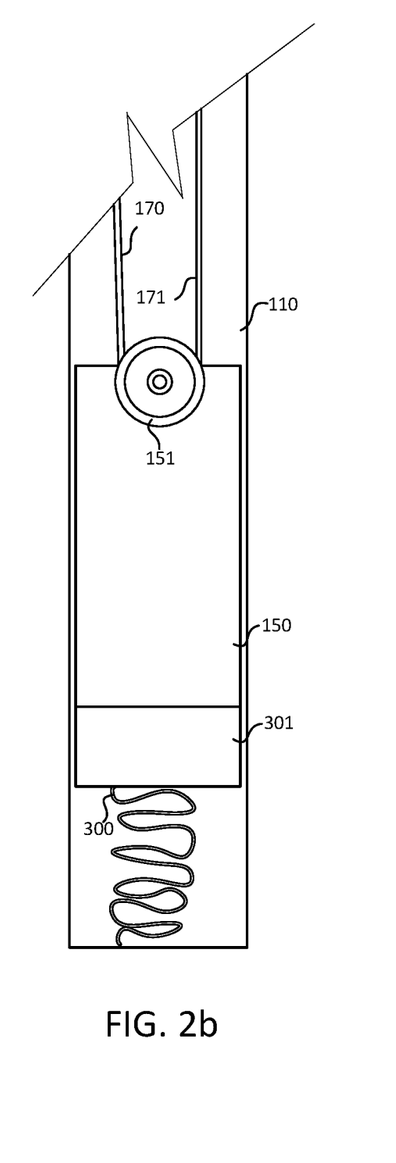

Now referring to FIG. 2b, there is shown another embodiment of the cable retrieving system wherein a blocking mechanism 301 is provided. The blocking mechanism 301 comprises an electromagnet mechanically secured to the moveable counterweight 150 and electrically connected to a controllable voltage source, not shown, which is an embodiment of a control unit, by means of at least two electrical conductors 300. It will be appreciated that, upon application of a voltage between the two electrical conductors 300, a current flows in the electromagnet 301, resulting in a magnetic attractive force exerted between the electromagnet 301 and the wall of the enclosure 110. In fact, it will be appreciated that the enclosure 110 comprises a magnetically permeable portion made, for instance, of steel in one embodiment. The skilled addressee will appreciate that any other material having a relative magnetic permeability higher than unity may alternatively be used for that purpose. It will be further appreciated that as a consequence to the magnetic attraction, the moveable counterweight 150 will be displaced horizontally towards the wall of the enclosure 110 comprising the magnetically permeable material and, by friction, a vertical braking force is applied onto the counterweight 150, thus reducing the pulling force applied onto the first portion 170 and the second portion 171 of the mechanical wire 112. It will be appreciated that setting to a zero value the voltage between the two electrical conductors 300 will cancel the magnetic force and therefore the corresponding friction force between the weight member 150 and the wall of the enclosure 110.

Figure 3A:
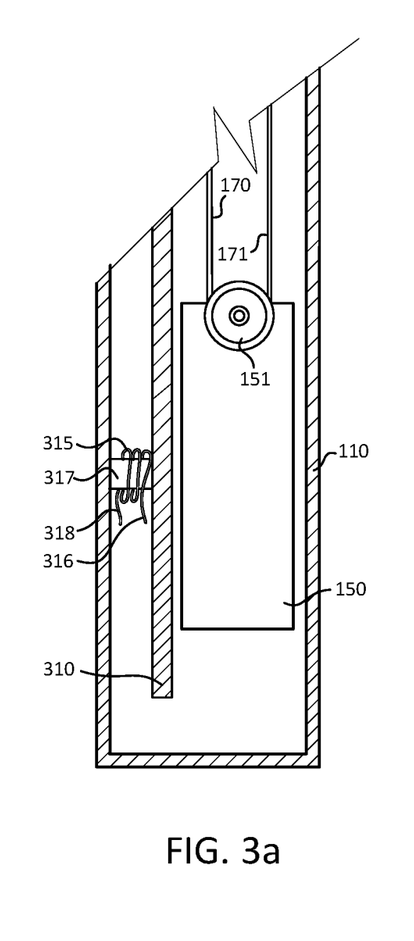
Figure 3B:
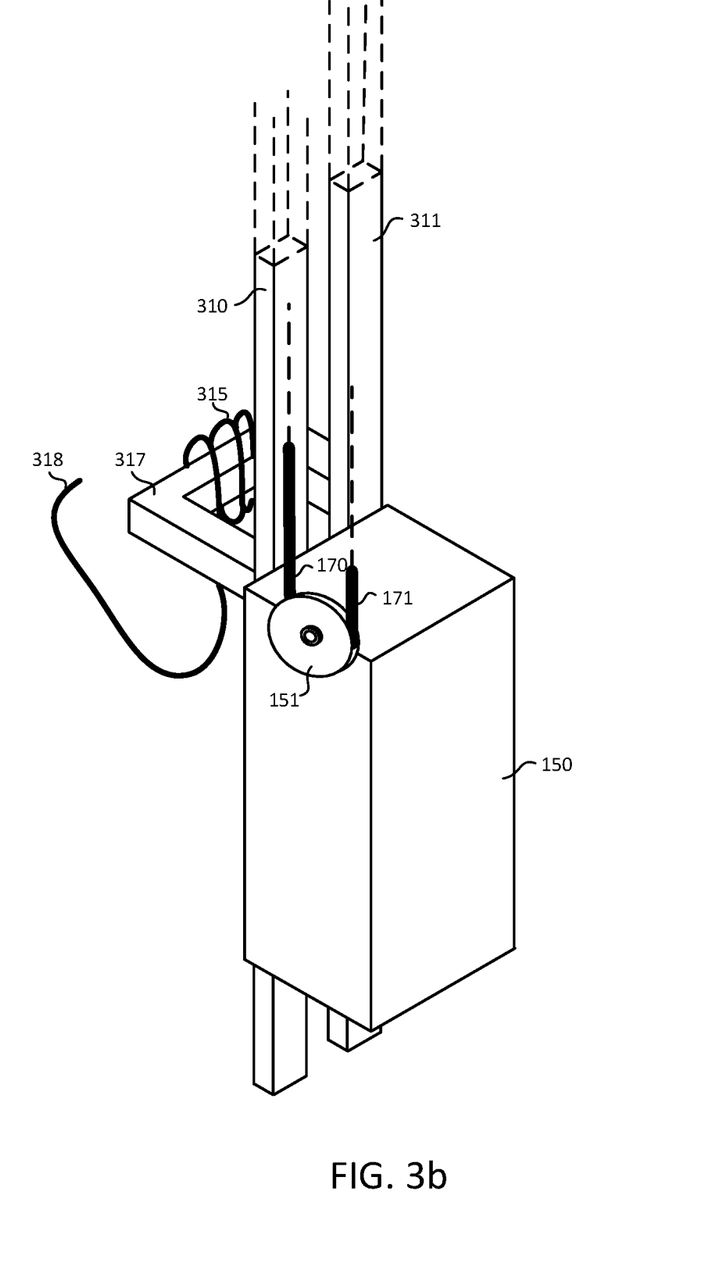
FIG. 3b is a top left perspective view showing one embodiment of the electromagnet secured to the enclosure of the cable retrieving system.

Now referring to FIGS. 3a and 3b, there is shown another embodiment of the cable retrieving system wherein the blocking mechanism comprises an electromagnet mechanically secured to a wall of the enclosure 110. In this embodiment, the electromagnet comprises a winding 315, a magnetic core 317 and two elongated bars 310, 311, also referred to as elongated breaking bars. It will be appreciated that the elongated bars 310, 311 are made of a magnetically permeable material. It will be appreciated that in this embodiment the electromagnet is fixed while in the embodiment previously described the electromagnet was secured to the moveable counterweight 150. The skilled addressee will appreciate that various methods may be used for generating a magnetic attraction between the enclosure 110 and the moveable counterweight 150.

In one embodiment illustrated in FIG. 3b, a closed magnetic circuit is implemented, wherein, upon the application of a voltage across leads 316 (not shown in the figure), 318 of the winding 315, a magnetic field will flow in the magnetic core 317, in the two elongated bars 310, 311 and in the moveable counterweight 150, provided that the moveable counterweight 150 is made of a magnetically permeable material or of any suitable material such as for instance a ferromagnetic alloy. The skilled addressee will appreciate that this will result in the application of a magnetic attraction force onto the moveable counterweight 150, perpendicularly to the elongated bars 310, 311, thus horizontally displacing the moveable counterweight 150 towards the ferromagnetic braking bars 310, 311. It will be appreciated that the magnetic interaction between the counterweight 150 and the braking bars 310, 311 will create a friction force vector with a component in the vertical direction, thus resulting in a reduction or even a cancellation of the pulling force along the first portion 170 and the second portion 171 of the mechanical wire 112 depending on a value of a current flowing in the winding 315.

It will be appreciated that FIGS. 3a and 3b illustrate a portion of the braking bars 310, 311 the bottom half of the enclosure 110 of the cable retrieving system. It will be appreciated that these braking bars 310, 311 extend vertically up to the top of the enclosure 110 in one embodiment, thus enabling the magnetic field to flow in the vertical direction thereof, thus enabling an attracting behavior similar to the one described previously, when the moveable counterweight 150 is located near the top of the enclosure 110.

Figure 4:
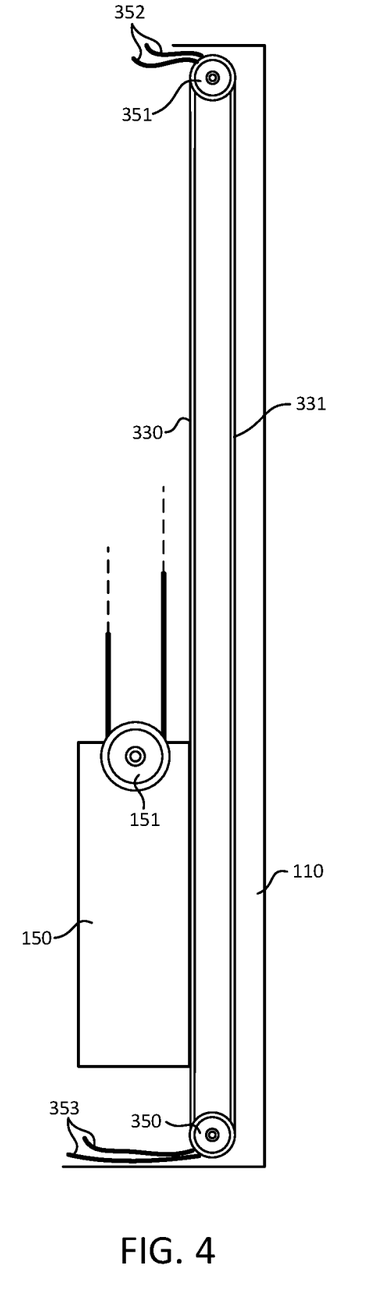
FIG. 4 is a drawing which illustrates another embodiment of the cable retrieving system wherein in this embodiment the weight member is secured on a belt looped around two rollers and further wherein two friction generation elements, herein illustrated as magnetic clutches exerting an attracting force between the rollers rotating parts and the fixed enclosure.

Now referring to FIG. 4, there is shown a partial view of another embodiment of the cable retrieving system.

In this embodiment, the blocking mechanism comprises two rollers 350 and 351. The roller 351 can be referred to as a top roller while the roller 350 can be referred to as a bottom roller. A vertical belt 331 is looped around the two rollers 350 and 351. The weight member 150 is fixedly secured on the vertical belt 331. The blocking mechanism further comprises two friction generation elements, herein depicted as magnetic clutches, operatively connected to each of the at least two rollers 350 and 351. It will be appreciated that the friction generation elements comprise two magnetic clutches in one embodiment. In another embodiment, a single magnetic clutch is used. The blocking mechanism further comprises a control unit, not shown, operatively connected to the clutches.

It will be appreciated that, when actuated using the control unit, the clutch causes the belt 331 to be secured at a given position thereby reducing the pulling force. It will be appreciated that the belt 331 may be made of various materials. For instance, and in accordance with an embodiment, the belt 331 is made of an elastomeric material. In another embodiment, the belt 331 is made of metal. In another embodiment, the belt 331 comprises a chain.

According to an embodiment, the belt is toothed. It will be appreciated that in the embodiment disclosed in FIG. 4, the vertical motion of the vertical belt 330 is controlled using the magnetic clutches. In fact, each magnetic clutch is coaxially engaged with a corresponding roller of the two rollers 350, 351. In this embodiment, each of the magnetic clutches is actuated using an electric current provided via a pair of electric wires 352, 353. A magnetic attraction force is obtained between the magnetic clutches and the rollers 351 and 352 upon the providing of the electric current in the electric wires 352, 353. This results in a braking friction moment being exerted on the rollers 350, 351. As a result of the interaction between the magnetic clutches and rollers 350, 351, the vertical belt 330 is maintained into a resting state, thus enabling the counterweight 150 to also be forced into a corresponding resting state.

It will be appreciated that in another embodiment, not shown, only one of the rollers 350 and 351 is associated with a magnetic clutch. In such embodiment, the braking action of the magnetic clutch is applied on only one of either the rollers 350 and 351.

It will be appreciated that in another embodiment, not shown, the friction generation element comprises a disc brake and braking pads coaxially mounted to at least one of the rollers 350 and 351. In such embodiment, the braking action of the friction generation element is carried out by enabling a direct contact between the braking pads and the disc brake.

Figure 5A:
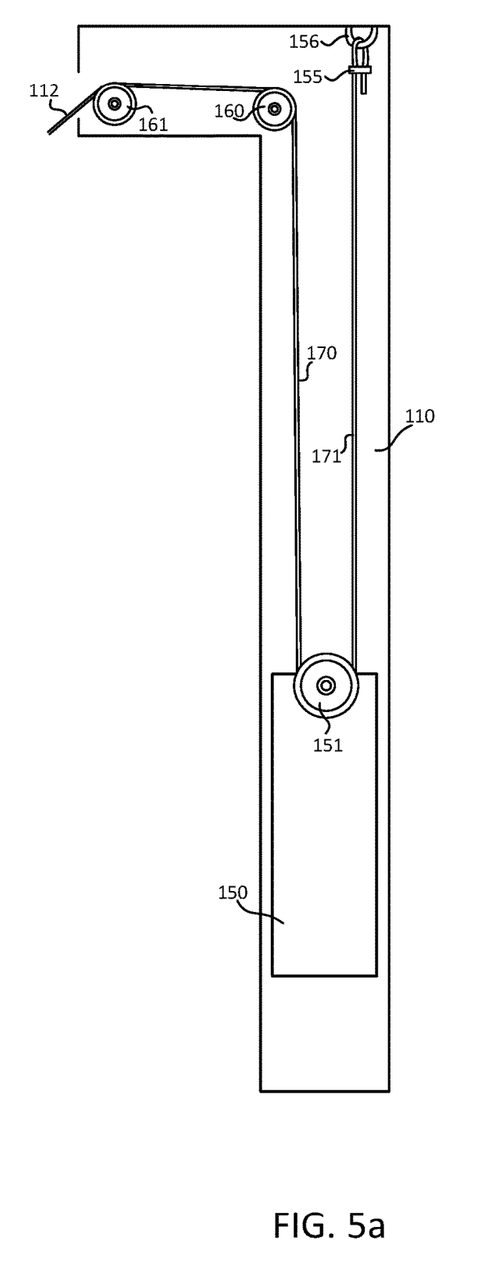

Now referring to FIG. 5a, there is shown another embodiment of the cable retrieving system wherein an additional pulley 161 is provided inside the enclosure 110 of the cable retrieving system. It will be appreciated by the skilled addressee that the addition of the pulley 161 horizontally positioned at a given distance from the pulley 160 enables the mechanical wire 112 to run horizontally over a given distance, whereas at such further distance the mechanical wire 112 is led into a diagonal direction towards the ground at a point of the charging station closer to the user. It will be appreciated that this enables the user to more easily maneuver the electric cable and the plug. It will be appreciated that FIG. 5a illustrates an embodiment with two pulleys 160 and 161 mechanically secured to the enclosure 110 at its top part.

Figure 5B:
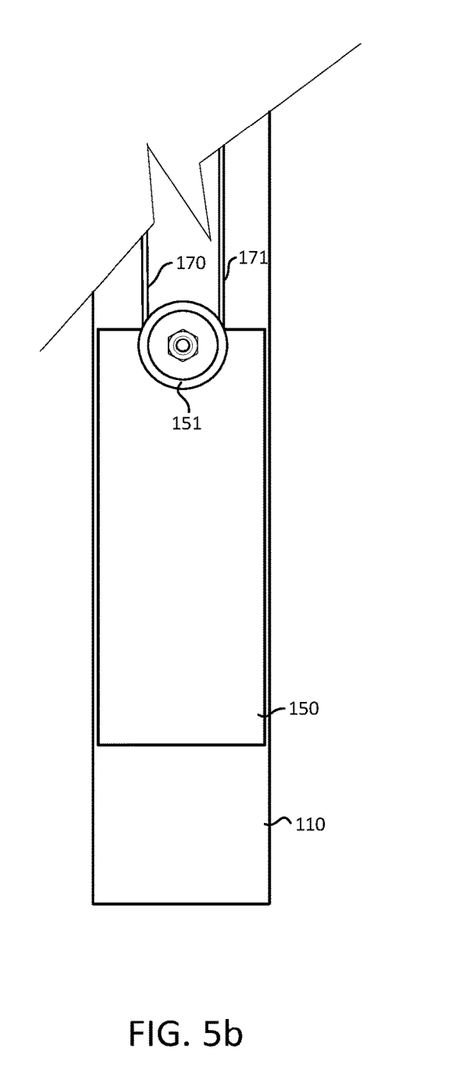

Referring now to FIG. 5b, it will be appreciated that the at least one pulley is mechanically secured to the moveable counterweight 150 using a mechanical retainment hardware fixing the hub of the at least one pulley to the moveable counterweight 150. More precisely and in the embodiment shown in FIG. 5b, an hexagonal bolt is provided as a retaining method. The skilled addressee will appreciate that various alternative embodiments may be used for fixing the hub of the at least one pulley to the moveable counterweight 150. It will be appreciated that in all the cases where the pulley is used, the rotating part of the at least one pulley is allowed to rotate freely around the attachment hardware.

Figure 6:
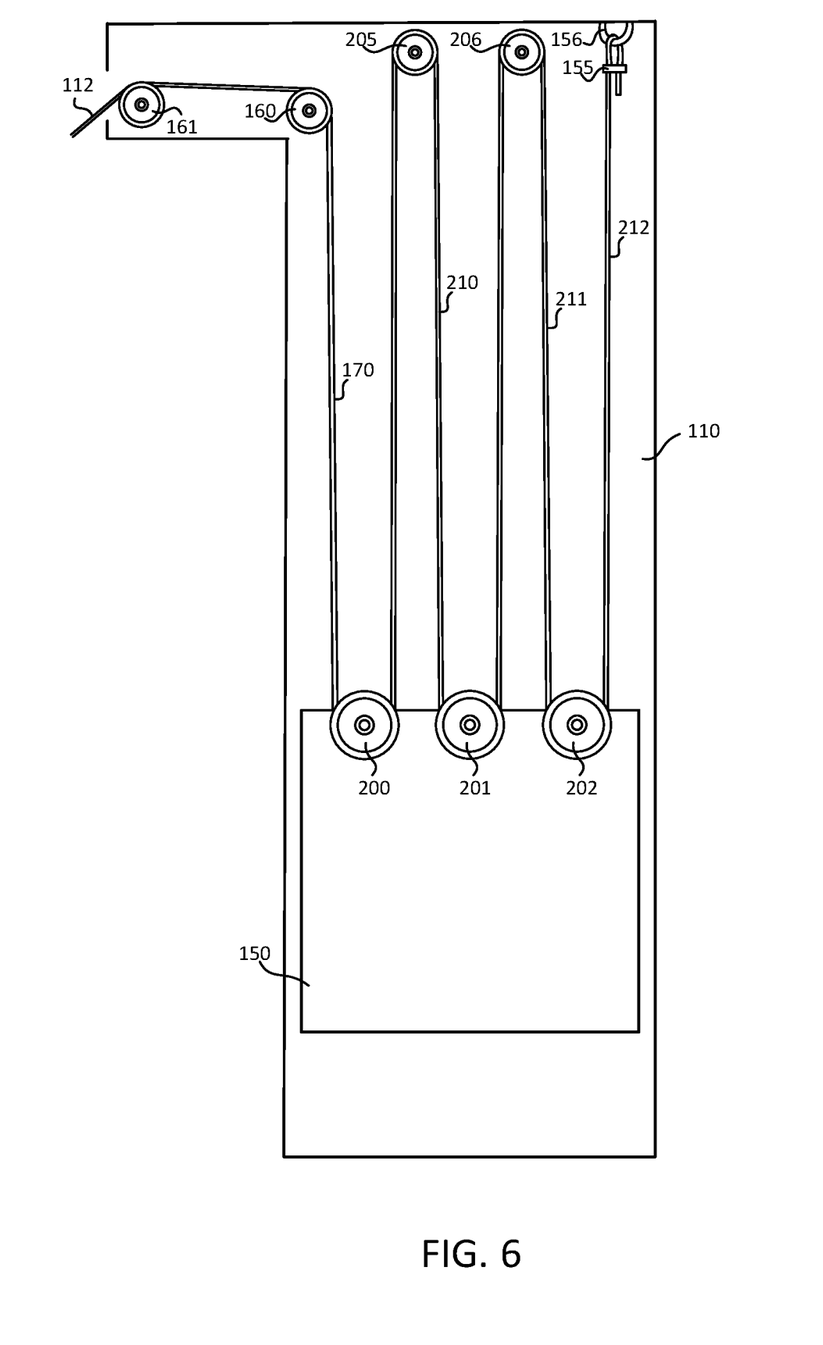
FIG. 6 is a drawing which illustrates another embodiment of the enclosure of the cable retrieving system. In this embodiment, the enclosure comprises four pulleys mounted inside the enclosure near its opening and a weight member comprising three pulleys secured on the moveable counterweight.

Now referring to FIG. 6, there is shown another embodiment of the cable retrieving system wherein the enclosure 110 comprises a weight member comprising a moveable counterweight 150 to which are mechanically secured three pulleys 200, 201, 202 around each of which is looped the mechanical wire 112. In this embodiment, four pulleys 160, 161, 205, 206 are located at the top, inside, of the enclosure 110 and are secured to it. The skilled addressee will appreciate that each of the wire portions 170, 210, 211 and 212 shown in FIG. 6 is an individual segment of the same mechanical wire 112. It will be appreciated that by using a greater number of pulleys, as disclosed in FIG. 6, the horizontal extension range of the mechanical wire 112 may be increased six-fold with respect to the vertical elevation range of the counterweight 150 inside the enclosure 110 of the cable retrieving system which is of great advantage. This is the result of adding a greater number of pulleys secured to the counterweight 150 and adding a corresponding number of pulleys secured to the enclosure 110 of the cable retrieving system. The example shown in FIG. 6 illustrates an advantage obtained when increasing a number of pulleys, and it will be appreciated that the same principle applies for any number of n pulleys whether they are secured to the enclosure or to the moveable counterweight 150.

Figure 7:
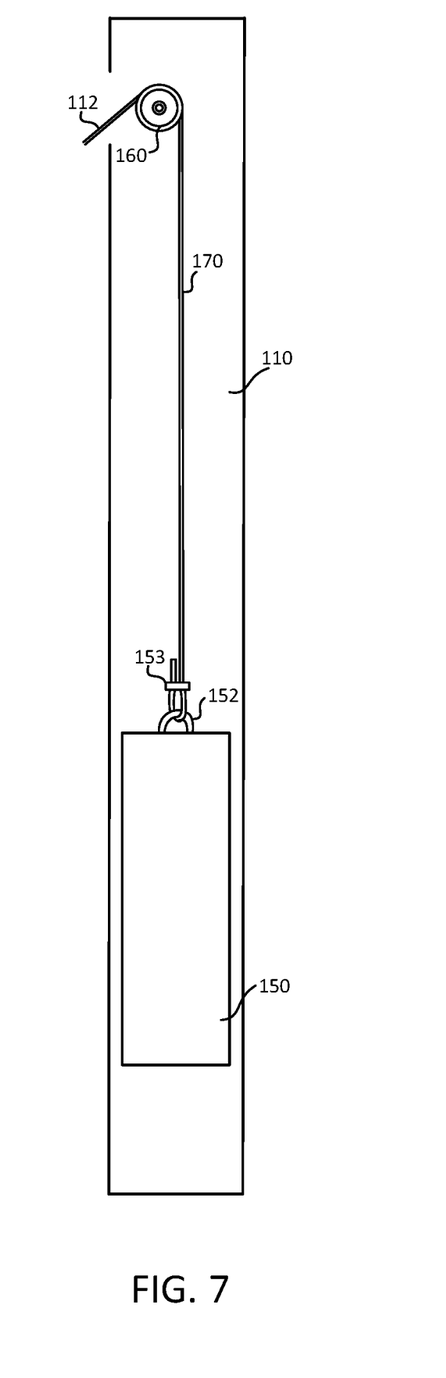
FIG. 7 is a drawing which illustrates another embodiment of the enclosure of the cable retrieving system and its pulling mechanism wherein the pulling mechanism comprises a weight member comprising only a moveable counterweight and wherein a second end of the mechanical wire is secured to the moveable counterweight.

Now referring to FIG. 7, it will be appreciated that in an alternative embodiment, the pulling mechanism comprises a weight member, which includes a moveable counterweight 150 with no pulley attached to it. In this embodiment, only one pulley 160 is positioned at the top part, inside, of the enclosure 110 near its opening. The pulley 160 is secured to the enclosure 110. In this embodiment the mechanical wire 112 has its second end secured on the moveable counterweight 150. In this embodiment, the horizontal extension range of the mechanical wire 112 is equal to the vertical elevation range of the moveable counterweight 150 inside the enclosure 110.

It will be appreciated that FIG. 7 does not illustrate the active blocking mechanism for braking the moveable counterweight 150, which can be implemented using any of the methods illustrated previously in FIG. 2b, in FIG. 3a or in FIG. 4 for instance. In fact, it will be appreciated that the purpose of FIG. 7 is simply to illustrate an embodiment with no pulley attached to the weight member 150. The skilled addressee will appreciate that various alternative embodiments may be provided without departing from the scope of the invention.

What is claimed is:

1. A cable retrieving system for a charging station adapted for recharging an electric vehicle, the charging station comprising an electric cable and a plug for enabling an electrical connection with the electric vehicle, the system comprising:
   a mechanical wire having a first end secured to the electric cable and a second end;
   an enclosure comprising an opening suitable for the mechanical wire;
   a pulling mechanism located in the enclosure, the pulling mechanism comprising a weight member located in the enclosure and mounted on a portion of the mechanical wire to thereby create a pulling force on the mechanical wire to thereby pull the electric cable towards the charging station; and
   a blocking mechanism operatively coupled to the weight member and operating between a motion-restricted state in which the weight member is restricted from moving and the pulling force is reduced and a motion-unrestricted state in which the weight member is free to move vertically without restriction wherein the blocking mechanism comprises:
   an electromagnet electrically connected to a power source;
   a control unit operatively coupled to the electromagnet;

wherein at least one of the weight member and the enclosure comprises the electromagnet;

wherein when said enclosure comprises said electromagnet, said weight member comprises a magnetically permeable portion;

further wherein when said weight member comprises said electromagnet, said enclosure comprises an elongated magnetically permeable portion located near the weight member;

further wherein when actuated using the control unit, the electromagnet causes the weight member to be biased against a corresponding magnetically permeable portion causing the weight member to be restricted from moving and the blocking mechanism to operate in the motion-restricted state; and further wherein when the electromagnet is not actuated, the pulling force generated by the weight member is sufficient to bring said plug towards the cable retrieving system.

2. The cable retrieving system of claim 1, wherein the enclosure is adjacent to the charging station.

3. The cable retrieving system of claim 1, wherein at least one portion of the charging station defines the enclosure.

4. The cable retrieving system of claim 1, wherein the second end of the mechanical wire is secured inside the enclosure, further wherein the weight member comprises a moveable counterweight and at least one pulley secured on the moveable counterweight, further wherein the mechanical wire is engaged on the at least one pulley of the weight member.

5. The cable retrieving system of claim 1, wherein the second end of the mechanical wire is secured to the weight member.

6. The cable retrieving system of claim 4, wherein the enclosure further comprises at least one pulley mounted inside the enclosure, further wherein the mechanical wire is engaged on the at least one pulley mounted inside the enclosure near the opening.

7. The cable retrieving system of claim 1, wherein the electromagnet comprises a coil, an iron core receiving the coil and at least two electrical conductors operatively connected to the iron core.

8. The cable retrieving system of claim 1, wherein the elongated magnetically permeable portion is a portion of a wall of the enclosure.

9. The cable retrieving system of claim 1, wherein said enclosure comprises said electromagnet; further wherein said electromagnet is installed along an elongated magnetically permeable portion comprising at least two electrical conductors secured in the enclosure.

10. A cable retrieving system for a charging station adapted for recharging an electric vehicle, the charging station comprising an electric cable and a plug for enabling an electrical connection with the electric vehicle, the system comprising:

a mechanical wire having a first end secured to the electric cable and a second end;

an enclosure comprising an opening suitable for the mechanical wire;

a pulling mechanism located in the enclosure, the pulling mechanism comprising a weight member located in the enclosure and mounted on a portion of the mechanical wire to thereby create a pulling force on the mechanical wire to thereby pull the electric cable towards the charging station; and a blocking mechanism operatively coupled to the weight member and operating between a motion-restricted state in which the weight member is restricted from moving and the pulling force is reduced and a motion-unrestricted state in which the weight member is free to move vertically without restriction; and wherein the blocking mechanism comprises:

two rollers, a vertical belt looped around the two rollers and on which is secured the weight member, a friction generation element operatively connected to at least one of the at least two rollers, a control unit operatively connected to the friction generation element, wherein when actuated using the control unit, the friction generation element causes the belt to be secured at a given position thereby reducing the pulling force.

11. The cable retrieving system of claim 10, wherein the friction generation element comprises a clutch.

12. The cable retrieving system of claim 10, wherein the friction generation element is composed of a disc and braking pads.

13. The cable retrieving system of claim 10, wherein the friction generation element is composed of a brake drum and braking shoes.

14. The cable retrieving system of claim 10, wherein the belt is made of an elastomeric material.

15. The cable retrieving system of claim 10, wherein the belt is made of metal.

16. The cable retrieving system of claim 10, wherein the belt comprises a chain.

17. The cable retrieving system of claim 10, wherein the belt is toothed.

* * * * *